(12) United States Patent
Oliveux et al.

(10) Patent No.: US 11,506,144 B2
(45) Date of Patent: Nov. 22, 2022

(54) THRUST REVERSER CASCADE FOR AN AIRCRAFT NACELLE

(71) Applicants: SAFRAN, Paris (FR); Safran Nacelles, Gonfreville l'Orcher (FR)

(72) Inventors: Géraldine Oliveux, Moissy-Cramayel (FR); Bertrand Desjoyeaux, Moissy-Cramayel (FR); Cedric Thomas, Moissy-Cramayel (FR)

(73) Assignees: Safran Nacelles, Gonfreville l'Orcher (FR); Safran, Paris (FR)

( * ) Notice: Subject to any disclaimer, the term of this patent is extended or adjusted under 35 U.S.C. 154(b) by 4 days.

(21) Appl. No.: 16/785,117

(22) Filed: Feb. 7, 2020

(65) Prior Publication Data

US 2020/0291893 A1   Sep. 17, 2020

Related U.S. Application Data

(63) Continuation of application No. PCT/FR2018/052031, filed on Aug. 7, 2018.

(51) Int. Cl.
*F02K 1/72* (2006.01)
*F02K 1/54* (2006.01)

(52) U.S. Cl.
CPC ............ *F02K 1/72* (2013.01); *F02K 1/54* (2013.01); *F05D 2300/6034* (2013.01)

(58) Field of Classification Search
CPC ... F02K 1/54; F02K 1/72; B29C 66/72; B29C 66/721; B29C 66/72143
See application file for complete search history.

(56) References Cited

U.S. PATENT DOCUMENTS

| | | | |
|---|---|---|---|
| 3,024,604 A * | 3/1962 | Walton | F02K 1/56 239/265.29 |
| 5,152,860 A | 10/1992 | Grossman et al. | |
| 9,140,211 B2 | 9/2015 | Metezeau et al. | |
| 9,206,765 B2 | 12/2015 | Vauchel | |
| 2016/0186689 A1* | 6/2016 | Bartel | B29C 33/52 239/265.19 |
| 2016/0263820 A1 | 9/2016 | Kruckenberg | |
| 2018/0222131 A1* | 8/2018 | Ducrot | B29C 33/0033 |
| 2019/0285028 A1* | 9/2019 | Shetty | F02K 1/72 |

FOREIGN PATENT DOCUMENTS

JP   H0716935   1/1995

OTHER PUBLICATIONS

International Search Report for International Application PCT/FR2018/052031, dated Nov. 7, 2018.
Search Report issued in corresponding Russian Application No. 2020105193, completed Dec. 28, 2021.

* cited by examiner

*Primary Examiner* — Craig Kim
(74) *Attorney, Agent, or Firm* — Burris Law, PLLC

(57) ABSTRACT

A thrust reverser cascade for an aircraft nacelle includes a plurality of blades having a first and a second surface, the blades being connected to members connected to attachment flanges for attaching the thrust reverser cascade to the nacelle. At least one of the surfaces of the blades is covered with at least one layer of fibers, each layer including a plurality of fiber pieces which are pre-impregnated with resin. The fiber pieces are superimposed on one another, positioned parallel to the aerodynamic surface of the blade and oriented in different directions.

15 Claims, 5 Drawing Sheets

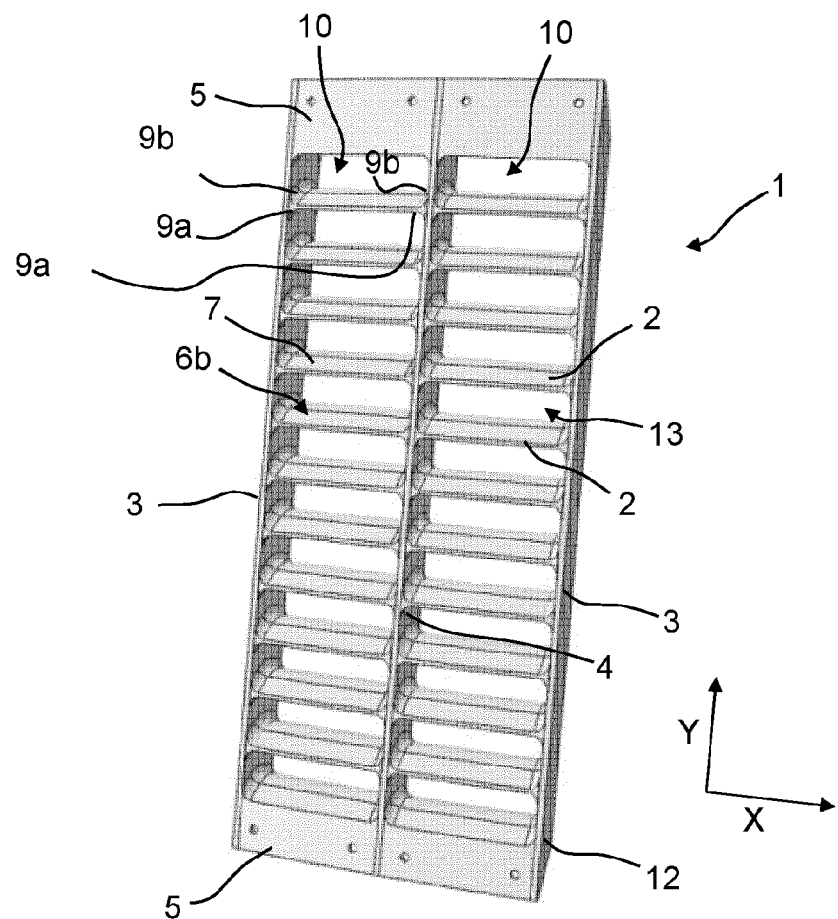
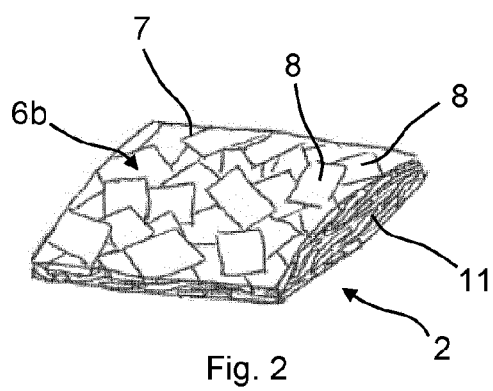
Fig. 1
Fig. 2

THRUST REVERSER CASCADE FOR AN AIRCRAFT NACELLE

CROSS-REFERENCE TO RELATED APPLICATIONS

This application is a continuation of International Application No. PCT/FR2018/052031, filed on Aug. 7, 2018, which claims priority to and the benefit of FR 17/57569 filed on Aug. 7, 2017. The disclosures of the above applications are incorporated herein by reference.

FIELD

The present disclosure relates to a thrust reverser cascade for a nacelle of an aircraft turbojet engine.

BACKGROUND

The statements in this section merely provide background information related to the present disclosure and may not constitute prior art.

A turbojet engine nacelle generally has a substantially tubular structure comprising an air inlet upstream of the turbojet engine, a middle section intended to surround a fan of the turbojet engine, a downstream section intended to surround the combustion chamber of the turbojet engine and possibly embedding thrust reversal means. In general, the nacelle possibly terminates in an ejection nozzle whose outlet is located downstream of the turbojet engine.

Modern nacelles are intended to accommodate a bypass turbojet engine adapted to generate via the blades of the rotating fan a hot air flow (primary flow) and a cold air flow (secondary flow) which circulates outside the turbojet engine through an annular passage, also called flow path, formed between a fairing of the turbojet engine and an inner wall of the nacelle.

Both air flows are ejected from the turbojet engine at the rear of the nacelle. The role of a thrust reverser, during the landing of an aircraft, is to improve the braking capability of the latter by redirecting forwards at least one portion of the air ejected from the turbojet engine.

During this phase, the thrust reverser obstructs at least one portion of the flow path of the cold flow and directs this flow towards the front of the nacelle, thereby generating a counter-thrust which adds to the braking of the wheels and airbrakes of the airplane.

In general, the structure of a thrust reverser comprises a thrust reverser cowl displaceable between, on the one hand, a reverse jet position in which it opens in the nacelle a passage intended for the diverted air flow and, on the other hand, a direct jet position in which it closes this passage.

In the case of a thrust reverser with cascade vanes, also called thrust reverser vanes or cascades, the reorientation of the air flow is performed by cascade vanes, associated to thrust reverser flaps brought to block at least partially the air circulation flow path, the cowl having only but a sliding function aiming at uncovering or covering these thrust reverser cascades.

In a known manner, the thrust reverser cascades are mounted on at least one end frame transmitting the counter-thrust provided by the bladings to the entire thrust reverser structure which, in turn, is attached to the propulsion unit comprising the turbojet engine.

However, the thrust reverser cascades made according to the known manufacturing methods of drape-molding pre-impregnated fabrics around tooling are quite fragile because of the constitution of laminates prone to delamination. They are also expensive.

There are also manufacturing methods using materials with short or discontinuous randomly distributed fibers and thermo-compressed or injected, as described in U.S. Patent Publication No. 2016/0186689.

This document describes a thrust reverser cascade manufactured by co-consolidating stiffeners including the pre-consolidated fastening flanges and pre-consolidated blades. The stiffeners are constituted by a polymer reinforced with continuous fibers and the blades by a thermoplastic resin reinforced with discontinuous fibers.

However, these methods of the prior art allow for very limited mechanical characteristics, affecting the aerodynamic performance of the cascades and the lightweight thereof.

SUMMARY

This section provides a general summary of the disclosure and is not a comprehensive disclosure of its full scope or all of its features.

The present disclosure provides a thrust reverser cascade for a nacelle of an aircraft turbojet engine providing high mechanical characteristics and good aerodynamic performances while allowing the making of complex geometries.

The present disclosure concerns a thrust reverser cascade for an aircraft nacelle comprising a plurality of blades having a first and a second surface. The blades being linked to spars which are connected to fastening flanges intended for fastening the thrust reverser cascade on the nacelle.

According to the present disclosure, at least one of the aerodynamic surfaces of the blades is lined with at least one fibrous web comprising a plurality of fiber pieces pre-impregnated with resins. The fiber pieces are superimposed on each other, positioned parallel to the aerodynamic surface of the blade, parallel to each other and oriented according to different directions.

The aerodynamic surfaces of the blades correspond to the surfaces licked by the air flow during the use of the thrust reverser, that is to say the intrados and extrados surfaces of these blades.

Advantageously, the blades are entirely constituted by at least one fibrous web across the entire thickness thereof. In other words, the blades are entirely constituted by fiber pieces, that is to say they comprise fiber pieces across the entire thickness thereof. Thus, in such a configuration, at least one fibrous web delimits at least locally the thickness of the blade. Indeed, the blades may be formed across the entire thickness thereof by an aggregate of superimposed fiber pieces or according to another configuration, by an elementary preform or core of fiber pieces forming a first fibrous web used as a support to be covered afterwards at a second step with fibrous webs over its aerodynamic surfaces.

Advantageously, the blades are linked to the spars, by connection areas formed by fibrous webs disposed in a continuous manner over at least the junction of said blades with the associated adjacent spars, and in one form, at least from the blades to the areas of junction of said blades with the associated adjacent spars.

The areas of connection of a blade and of an adjacent spar are formed by the extension of at least one fibrous web of said blade over an adjacent spar portion. The fiber pieces are superimposed on each other, positioned parallel to the aerodynamic surface of the connection areas and oriented according to different directions.

According to a particular technical feature, the spars and/or the fastening flanges comprise fibrous webs 7 at least at the surface thereof and at least locally.

In a particular configuration, the spars and/or the fastening flanges are entirely formed by fibrous web(s), that is to say they are constituted by at least one fibrous web across the entire thickness thereof.

In an alternative configuration, the spars and/or the fastening flanges are formed by a combination between a composite material with continuous fibers and at least one fibrous web disposed at least locally at the surface, this fibrous web comprising fiber pieces superimposed on each other, positioned parallel to each other and oriented according to different directions.

According to a particular technical feature, the fastening flanges are mostly (that is to say more than 50%) constituted by fiber pieces superimposed on each other forming web(s), positioned parallel to the surfaces of the flanges and to the neighboring surfaces as well as the surfaces of connection with the flanges and oriented according to different directions. In one form, the fastening flanges are entirely constituted by fiber pieces superimposed on each other forming web(s).

According to an advantageous technical feature, the blades have a variable thickness.

In one form, the thickness of one blade varies by a factor between 1 and 15 times its smallest thickness, this allows creating performing aerodynamic profiles. The thickness varies along the direction of the air flow, that is to say from a leading edge up to a trailing edge of the blade.

According to one variant, the ratio of fibers is higher than 50% of the total volume of the composite material formed by the fibrous webs.

According to another variant, the ratio of fibers is in the range of 60% of the total volume of the composite material formed by the fibrous webs.

According to another variant, the fiber pieces have a thickness comprised between 0.1 mm and 0.4 mm, a length comprised between 15 mm and 60 mm and a width comprised between 10 mm and 40 mm.

According to another variant, the fiber pieces comprise fibers woven so as to form woven mats of fiber pieces pre-impregnated with resin.

According to one variant, the resin serving as a matrix embedding the fibers and consolidating the cascade is a thermosetting matrix. In one example, the fibers are trapped within a thermosetting matrix such as from the epoxides, benzoxazines, polyesters, bismaleimides family.

According to another variant, the resin may be a thermoplastic resin. In one example, the fibers are trapped within one or several thermoplastic matrix/matrices selected from the group consisting of polyamides, polypropylenes, polyetherimides (PEI), polyethersulfones (PES), polyphenylene sulfides (PPS), polyaryletherketones (PAEK), polyether-ether-ketones (PEEK), and Polyether-ketone-ketones (PEKK).

Thus, the present disclosure provides a thrust reverser cascade for a nacelle of an aircraft turbojet engine featuring high mechanical characteristics and good aerodynamic performances.

It also allows making complex geometries and is less expensive than those of the prior art.

Indeed, it is possible to make the shape of the blade ("C" like or "U" like shaped, for example), that of its leading edges (rounded or with sharp ridges) and the thickness of the blade from one edge to the other, vary more easily.

This allows creating performing aerodynamic profiles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a perspective view of a thrust reverser cascade according to the present disclosure;

FIG. 2 is a detail view of a blade portion comprising a fibrous web constituted by a stacking or superimposition of fiber pieces according to the present disclosure;

Figure 3:
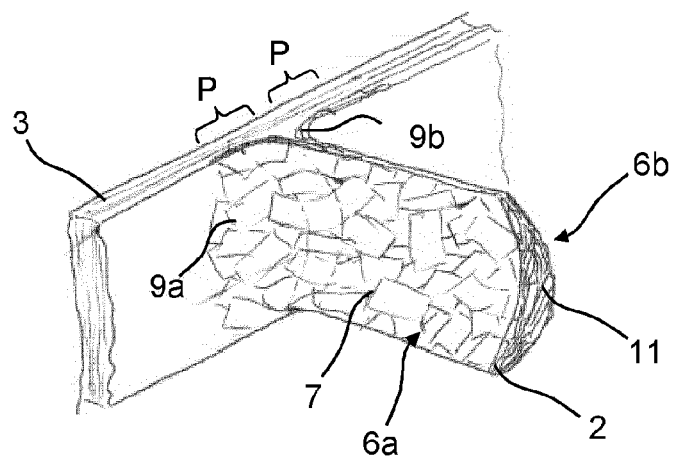
FIG. 3 illustrates a connection area between a blade and a spar according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 represents a thrust reverser cascade 1 for an aircraft nacelle according to one form of the present disclosure.

The thrust reverser cascade 1 comprises a plurality of blades 2 linked to spars 3, 4. The spars 3, 4 are linked to fastening flanges 5 intended for fastening the thrust reverser cascade 1 on the nacelle.

The thrust reverser cascade 1 may be a straight or diverted flow cascade:

the so-called "straight" counter-thrust cascade 1 comprises aerodynamic blades 2, also called bladings, and substantially planar spars 3 without any aerodynamic lift: the aerodynamic thrust of the bladings 2 being oriented in a radial plane longitudinal to the cascade 1;

in the case of a so-called "diverted" counter-thrust cascade 1, either the bladings 2 generate a counter-thrust diverted in a radial direction with respect to the cascade 1 and the spars 3 remain substantially planar, or the bladings 2 generate a longitudinal counter-thrust and the spars 3 are formed to generate a lateral counter-thrust, the sum of both of them providing a diverted counter-thrust.

As example, FIG. 1 represents a so-called "straight" counter-thrust cascade 1.

The number of spars, as long as there is at least one of them, is not restrictive. In general, the blades 2 are disposed in a ladder-like fashion, and/or on either side of the spars 3. The blades 2 may also be disposed on only one side of a spar 3.

Moreover, it is possible to use cascades 1 having only two framing spars, and it is also possible to have cascades having up to seven and even fifteen spars 3.

More specifically and according to this particular form, the blades 2 are disposed parallel to each other in the same row 10 between two spars 3, 4 of the cascade 1.

The blades 2 comprise surfaces 6a, 6b which are disposed parallel to the aerodynamic surfaces and respectively constitute the intrados surfaces and the extrados surface of the blade 2. The "intrados" surface refers to the internal surface of the blade 2, namely the surface oriented towards the cold flow path during the use thereof, whereas the "extrados" surface refers to the external surface of the blade opposite to the intrados surface and mainly oriented towards the outside of the nacelle during the use thereof.

The spars 3, 4 extend along a longitudinal direction Y, substantially perpendicular to a transverse direction X parallel to that of the blades 2.

The thrust reverser cascade 1 comprises two lateral spars 3 and a central spar 4, separating two rows 10 of blades 2. The blades 2 of one row 10 being parallel to each other and aligned.

A row of blades 10 is surrounded by a lateral spar 3 and by a central spar 4.

The fastening flanges 5 extend along the transverse direction X and are disposed on either side of the rows of blades 10. Two blades 2 may be integrated to a fastening flange 5.

The two lateral spars 3 and the two fastening flanges 5 form a peripheral frame 12 surrounding the blades 2.

The thrust reverser cascade 1 optionally comprises attachments of fastening means (not represented) along the two lateral spars 3.

The blades 2 channel the air flow and divert it according to the longitudinal direction Y while producing a thrust on the blades 2.

The spars 3, 4 channel the air flow and possibly divert it in the transverse direction X.

All of the aerodynamic forces applied on the blades 2 and the spars 3, 4 are taken on in the peripheral frame 12 and transmitted to the structure of the thrust reverser through attachments on the fastening flanges 5.

According to the present disclosure, at least the surface 6a, 6b of the blades 2 is lined with fibrous webs 7 each comprising a plurality of fiber pieces 8 pre-impregnated with resins, as illustrated in FIG. 2. In other words, a fibrous web 7 is formed by an aggregate and a superimposition of fiber pieces 8 comprising at least one layer of fiber pieces across the thickness thereof.

The fiber pieces 8 are superimposed on each other, positioned according to surfaces parallel to each other and oriented according to different directions, that is to say whose fibers have in these surfaces directions that are different from the directions of the fibers of the neighboring piece(s). The fiber pieces 8 are superimposed on each other while being offset from each other.

The fiber pieces 8 form chips of fibers that are discontinuous, unidirectional and/or woven, disposed according to directions parallel to the surfaces of the elements constituting the thrust reverser cascade 1 and especially parallel to the aerodynamic surfaces of the cascade 1.

More specifically, in one form, a fiber piece forms a slat, or slat of fibers, delimited at the periphery thereof by at least one peripheral edge forming a closed contour of the piece 8. In another form, each fiber of a piece 8 extends without any discontinuity from one edge to another of the peripheral edge by crossing it over the width thereof.

In another form, the blades 2 are constituted by fibrous webs 7, that is to say that the core 11 and the surface 6a, 6b of the blades 2 comprise fibrous webs 7.

As represented in FIG. 3, the blades 2 are linked to the spars 3, 4 by connection areas 9a, 9b formed by fibrous webs 7. In one form, the connection areas 9a, 9b are entirely formed by fibrous webs 7.

The connection areas 9a, 9b prolong the blades 2 and cover a portion P of the spars 3, 4. Thus, the surface 6a, 6b of the blades 2 are prolonged over the surface of the spars 3, 4.

The connection areas 9a, 9b are formed by a thickness of fiber pieces 8.

The connection areas 9a, 9b have an incurved shape and form bridges of matter between the blades 2 and the spars 3, 4 reinforcing the attachment thereof.

The connection areas 9a, 9b allow fastening the blade 2 to the spars 3, 4 while prolonging the aerodynamic surface of the blades 2. Hence, continuity of the aerodynamic surface is achieved.

According to this example, each blade 2 is prolonged by four connection areas 9a, 9b.

Indeed, each blade 2 is prolonged by two first connection areas 9a disposed at each end of the blade 2 to connect the same side of the blade 2, herein the intrados side, to the adjacent spars 3, 4 on either side of said blade 2, while considering that one blade 2 is connected to two spars 3, 4 parallel to each other.

Similarly, each blade 2 is prolonged by two second connection areas 9b disposed at each end of the blade 2, and opposite to the two first connection areas 9a, to connect the same side of the blade 2, herein the extrados side, to the adjacent spars 3, 4.

The function of the connection areas 9a, 9b is to fasten the blades 2 to the spars 3, 4. They provide a reinforced fastening in comparison with what is already known.

The spars 3, 4 and/or the fastening flanges 5 are lined with fibrous webs 7.

According to a possible configuration, the spars 3, 4 and/or the fastening flanges 5 are entirely constituted by fibrous webs 7, across the entire thickness thereof.

According to another variant, the spars 3, 4 and/or the fastening flanges 5 comprise a core constituted by continuous fibers, the fibers being unidirectional fibers and/or woven fibers, the cores of the spars 3, 4 being partially or entirely covered by the discontinuous fibrous webs 7 originating from the blades 2 and which extend or are prolonged in the portion of the spar 3, 4 exposed in a cell 13 of the cascade 1 (partially or entirely covering this surface).

The thrust reverser cascade 1 comprises cells 13 delimited by two blades 2 and portions of the spars 3, 4.

According to one form, the fibrous webs 7 systematically surround each cell 13 of the thrust reverser cascade 1 and provide a continuity of matter in the connection areas 9a, 9b of the blades 2 with the spars 3, 4.

In a cell 13 of the cascade 1, the fibrous webs 7 line the surfaces in a continuous manner, and in particular: the surface 6b of the first blade 2 at the foremost or upstream of the cell 13 with respect to the cascade 1, the connecting surface 9b towards one of the spars 3, 4, the surface of said spar opposite the associated cell 13 and adjacent to the end of the blade 2, the surface of the connection area 9a of the second blade 2 delimiting the cell 13, the surface 6a of this second blade 2 downstream of the cell 13 with respect to the cascade 1, the surface of the connection area 9a at the other end of the second blade, the surface of the associated adjacent spar, the surface of the connection area 9b at the surface 6b of the upstream blade of the cell 13.

Each blade 2 comprises a concave surface 6a and a convex surface 6b which are both evenly covered with fibrous webs 7. The concave surface 6a is intended to be generally oriented towards the upstream of the nacelle during the use thereof, when the cascade 1 is fastened on the nacelle.

The thrust reverser cascade 1 is made of composite materials constituted by fibers bonded by an organic matrix (thermosetting resin such as epoxy, benzoxazine, or BMI or the same, or thermoplastic resin such as polyamides, polypropylene, PEI, PEEK, PAEK or the same).

In one form, the volume ratio of fibers in the composite material is higher than 50% of the total volume of the composite. In another form, the volume ratio of fibers in the composite material is higher than 55% of the total volume of the composite.

Advantageously, the volume ratio of fibers is in the range of 60% of the total volume of the composite.

The fiber pieces 8 may include chips of unidirectional fibers or of woven fibers, constituted by carbon or glass or aramid fibers or a mixture of these materials or others.

The fiber pieces 8 are mostly organized into thin layers with a thickness comprised between 0.1 mm and 0.4 mm (namely equivalent to 0.15 kg/m$^2$ to 0.5 kg/m$^2$).

The fiber pieces 7 have circular or ovoid or else polygonal shapes.

The fiber pieces 8 have a width comprised between 10 mm and 40 mm and a length comprised between 15 mm and 60 mm.

The fiber pieces 8 are disposed along random directions and their largest dimensions are disposed according to lines parallel to the outer surfaces of the thrust reverser cascade 1 constituted by fibrous webs 7, such as the surface 6a, 6b of a blade 2.

Thus, the fiber pieces 8 in the form of elongate, superimposed and crossed shavings line in a continuous manner the surfaces 6a, 6b of the blades 2, at least one portion of the surfaces of the spars 3, 4 as well as the connection areas 9a, 9b between the blades 2 and the spars 3, 4.

Alternatively, the fiber pieces 8 comprise woven fibers which may be taffetas, satins or twills.

When the resin is a thermosetting resin, the method for manufacturing the thrust reverser cascade 1 comprises a step of thermo-compression in a mold.

According to other variants, the set of fibrous webs 7 that cover at least one of the surfaces of each of the blades 2 are prolonged over, and cover, at least one portion P of the associated spars 3, 4. In other words, the connections of the fibrous webs 7 of the blades 2 are connected on a face of the spar 3, 4 which allows, whenever the aerodynamic shapes and the generated aerodynamic thrusts allow so, simplifying the arrangement way of the fibrous webs 7 on the blades 2 and the connections with the spars 3, 4.

Figure 7:
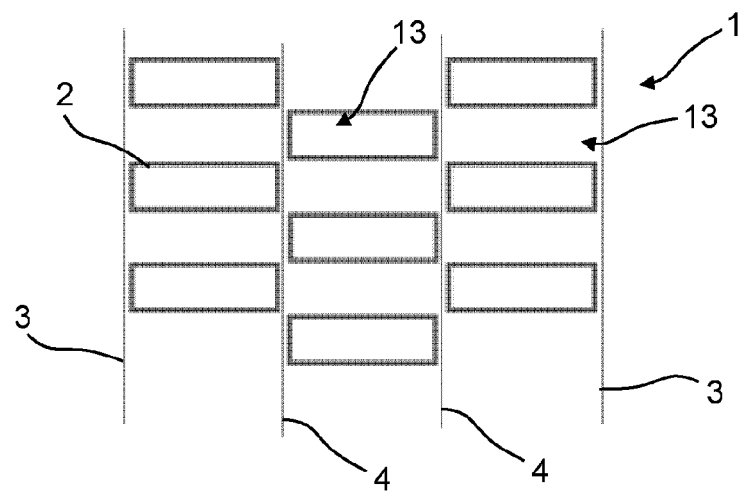
FIG. 7 illustrates a blade in which one cell out of two is surrounded by fibrous webs according to the present disclosure.

According to a first variant represented in FIG. 7, one cell 13 out of two is surrounded, on the internal side that is to say opposite the internal space delimited thereby, by fibrous webs 7. The cells 13 surrounded by fibrous webs 7 are homogeneously distributed over the entire cascade 1, in particular herein, said cells surrounded by fibrous webs are disposed in a quincunx.

Figure 8:
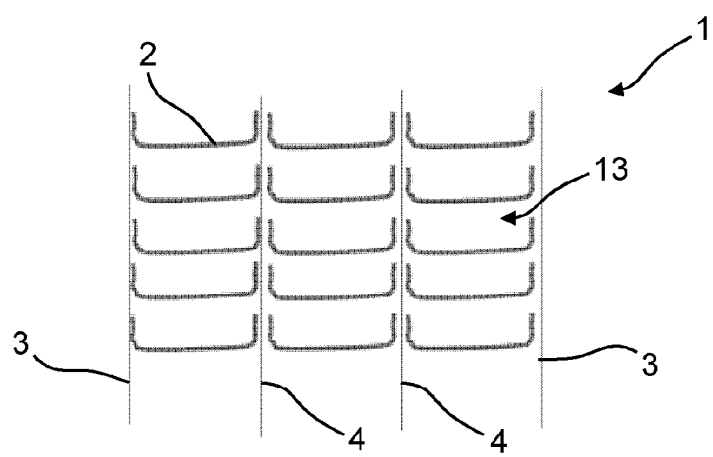
FIG. 8 illustrates blades with a U-shaped fold-back over the spars according to the present disclosure.

According to another variant represented in FIG. 8, the blades 2 have a "U"-shaped fold-back of fibrous webs over the adjacent spars 3, 4. To provide a homogeneity of the structural reinforcement created by the fibrous webs 7, these "U"-shaped fold-backs of fibrous webs 7 are disposed so as to cover the same surfaces 6a, 6b of the blades 2 over the entire cascade 1, for example the intrados surfaces or the extrados surfaces of each of the blades 2. In other words, the surfaces 6a, 6b of the blades 2 are lined with fibrous webs 7 which are prolonged on either side of each of the blades 2 over the adjacent spars, then having, at the level of each of the cells 13, a "U" like shape. In this configuration, the fibrous webs may cover in particular the same surfaces 6a, 6b of the blades 2 over the entire cascade 1 to homogenize the structural reinforcement provided by said fibrous webs 7.

According to a variant of FIG. 8, the "U"-shaped fold-backs at the level of the spars 3, 4 cover only but a portion of the side of the spar of the cell 13.

According to an alternative or complementary variant, the "U"-shaped fold-backs at the level of the spars 3, 4 are prolonged up to the root of the following blade thus entirely covering the side of the spar of the concerned cell 13. This variant promotes the filling of the connection of the upstream blade with the spar without involving the laying of an additional fibrous web 7.

Figure 4:
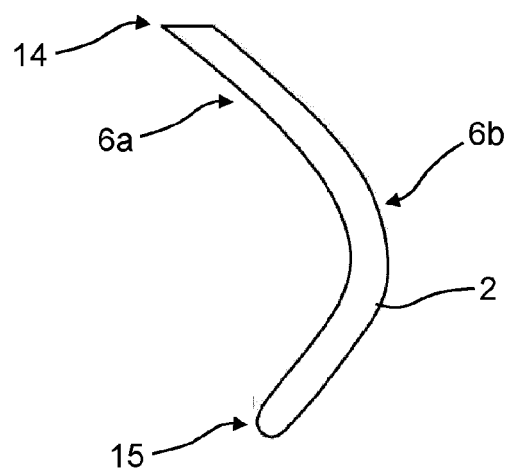
FIG. 4 illustrates a blade shape according to one form of the present disclosure.

FIG. 4 represents a cross-section of a blade 2 along the direction of the chord of the "C"-shaped incurved profile according to one form. The blade 2 comprises in the direction of the chord profile two end edges, one 15 of which forming the leading edge and the other one 14 forming the trailing edge.

According to a first variant, one or both of the end edges have a substantially shape ridge with a flat portion as shown by the reference numeral 14 in FIG. 4. According to another variant, the substantially sharp ridge constitutes the end of the intrados and extrados faces without a flat edge.

According to another variant, one or both of the end edges have a rounded shape as shown by the reference numeral 15 in FIG. 4.

The blade 2 of FIG. 4 has a constant thickness.

Figure 5:
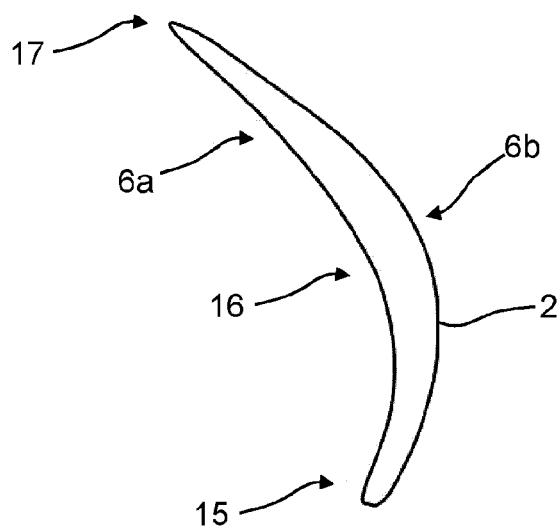
FIG. 5 illustrates a blade shape according to another form of the present disclosure.

According to another variant represented in FIG. 5, the blade 2 may have a variable thickness along the chord.

In this example, the thickness of the blade 2 is larger in a central area 16 of the blade 2 considered between its two ends, than at its leading edges 15.

In one form, the thickness of the blades 2 varies along the chord of the blade by a factor between 1 and 15 times its minimum thickness, that is to say the smallest one, which allows creating performing aerodynamic profiles.

According to a particular form of a blade with a variable thickness along the chord and for a chord length comprised between 30 and 60 mm, the thickness may vary from about 0.6 mm at the level of the leading edge having a radius of curvature of about 0.3 mm if the latter is rounded, evolving rapidly to a thickness of 1 mm and then increasingly up to an increased thickness of about 3 or 4 mm, and finally decreasing to about 0.3 and 0.5 mm in the vicinity of the trailing edge.

In this form, the blade 2 has a profiled trailing edge 17 and a rounded leading edge 15.

The parts produced using pre-impregnated fiber pieces 8 may easily include evolving thicknesses thanks to the thermo-compression molding process during which, thanks to the discontinuity of the fibers between the fiber pieces 8, each of the pieces could move relative to the neighboring pieces and facilitate the filling of the evolving thickness.

The connecting radii between the blades 2 and the spars 3, 4 vary according to the position along the chord, thereby allowing adapting the amount of material to the transmission of forces.

In other words, the connection areas 9a, 9b have variable shapes and thicknesses.

The height of the spars 3, 4 may be different from the chord of the blades 2.

Figure 6:
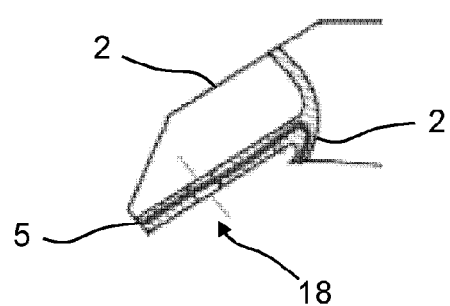
FIG. 6 illustrates an example of connection between a fastening flange and a blade according to the present disclosure.

As represented in FIG. 6, the fastening flange 5 may be connected on any portion of the blades 2. The fastening flange 5 comprises an orifice 18 into which a fastening element, such as a screw, is fitted or screwed.

The fastening flanges 5 may lie in the planes or particular surfaces connecting at the edges or at the middle of the spars 3, 4 or of the peripheral frame 12.

The blades 2 or bladings are not necessarily perpendicular to the spars 3, 4.

Figure 9:
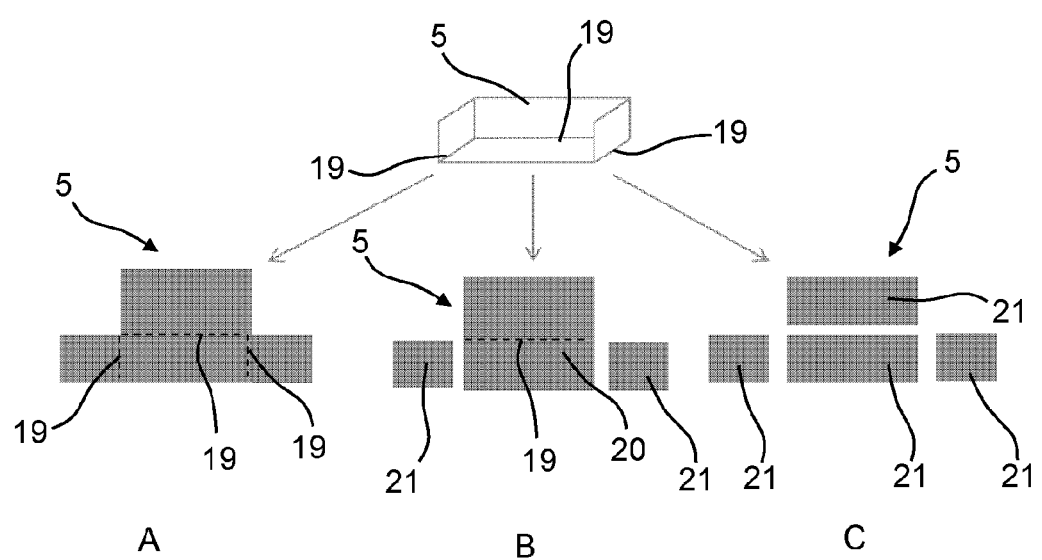
FIG. 9 illustrates several ways to make the fastening flanges according to the present disclosure.

The lining of the fastening flanges 5 may be carried out according to several configurations, as represented in FIG. 9 with the three different forms A, B and C.

The end lining of the fastening flanges 5 is carried out by "suitcase wedge" like trays, that is to say arranged so as to cover at least three ridges 19 of the fastening flange 5. These may include successive ridges to cover an edge with the angles delimiting it, as illustrated in FIG. 9, or concomitant ridges forming together an angle or wedge, such as for example the point of intersection of three ridges substantially perpendicular to each other.

According to a first form A of FIG. 9 showing an unfolded fastening flange 5, the fibrous webs 7 constitute a continuous lining. Once the fastening flange 5 is folded in a "suitcase wedge" like fashion, the fibrous webs 7 cover in a continuous manner three of the ridges 19 of the fastening flange 5.

According to a second form B of FIG. 9, the fastening flange 5 comprises a foldable portion 20 having one ridge 19 and two fins 21 which connect to the foldable portion 20 when the latter is folded.

According to a third form C of FIG. 9, the fastening flange 5 comprises four fins 21 constituted by fibrous webs 7 which are connected together by fibrous webs 7.

According to one variant, at the intersection between a blade 2 and a spar 3, 4 or between a blade 2 and a fastening flange 5 or between a spar 3, 4 and a fastening flange 5, heaps of fibers in the form of a "nail head" which could be inserted to promote the filling of the volume while keeping the fiber pieces as parallel as possible to the outer surfaces of the parts.

According to another alternative or complementary variant, linings or layers of continuous unidirectional and/or woven fibers may be disposed over long surfaces such as over the entire length of the spars 3, 4.

The fastening flanges 5 may also have variable thicknesses (bosses) allowing limiting the overall mass while adapting the thicknesses, for example around the fasteners.

Functional materials may be locally introduced such as glass fabric as a galvanic isolator between the carbon composites and the neighboring part or a specific anti-friction plastic film, or others, or a metallic insert.

The present disclosure also concerns a method for manufacturing a thrust reverser cascade 1.

The method comprises a prior step of making an elementary preform of the blades 2, the spars 3, 4 and the fastening flanges 5.

The elementary preforms are entirely constituted by fibrous webs 7. The elementary preforms may be made by drape-molding.

Afterwards, the elementary preforms are lined with fibrous webs 7 to form the thrust reverser cascade 1 and in particular so as to provide a continuity of the aerodynamic surface of the elements constituting the thrust reverser cascade 1.

Afterwards, a step of thermo-compression is applied to press the fiber pieces 8 forming the fibrous webs 7 on the surfaces of the elementary preforms and make them creep so as to conform to the geometry of the elementary preform.

According to a possible method, the manufacturing method does not comprise a step of making elementary preforms.

The elements constituting the thrust reverser cascade 1 are directly obtained by coverage and stacking of the fiber pieces 8 on each other and progressively. The thickness of the element of the thrust reverser cascade 1 increases incrementally and progressively as it is covered with layers of fiber pieces 8 forming the fibrous webs 7.

Afterwards, the manufacturing method comprises a step of thermoforming.

The present disclosure is described in the foregoing as example. It should be understood that those skilled in the art are able to carry out different variants of the present disclosure yet without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser cascade for an aircraft nacelle comprising a first plurality of blades, a second plurality of blades, a first spar, a second spar, and a third spar, the second spar disposed between the first and third spars, each blade having a first and a second aerodynamic surface, the first plurality of blades being linked to the first and second spars connected to fastening flanges configured to fasten the thrust reverser cascade on the nacelle, the second plurality of blades being linked to the second and third spars such that the first and second pluralities of blades are linked to the second spar, wherein at least one of the first and second aerodynamic surface of each blade is lined with at least one fibrous web comprising a plurality of individual fiber pieces pre-impregnated with resin in the form of chips, the plurality of chips being superimposed on each other in layers, positioned parallel to the at least one of the first and second aerodynamic surface of each blade, and are oriented in different directions;

wherein connection areas of a blade among the plurality of blades and of an adjacent spar are formed by an extension of the at least one fibrous web of the blade thermo-compressed over a portion of the adjacent spar, the connection areas extending the blade to cover at least a portion of the spar to which the blade is linked.

2. The thrust reverser cascade according to claim 1, wherein the pluralities of blades are linked to the spars by connection areas formed by fibrous webs disposed in a continuous manner at least from the pluralities of blades to areas of junction of the pluralities of blades with associated adjacent spars.

3. The thrust reverser cascade according to claim 1, wherein the pluralities of blades are formed by fibrous webs across a thickness of the pluralities of blades.

4. The thrust reverser cascade according to claim 1, wherein the spars and the fastening flanges include the at least one fibrous web across a thickness of each of the spars and fastening flanges.

5. The thrust reverser cascade according to claim 1, wherein the spars and/or the fastening flanges are formed by a combination of a composite material with continuous fibers and at least one fibrous web disposed at least locally on a surface of the composite material, the at least one fibrous web comprising fiber pieces superimposed on each other, positioned parallel to each other and oriented according to different directions.

6. The thrust reverser cascade according to claim 1, wherein the pluralities of blades have a variable thickness.

7. The thrust reverser cascade according to claim 6, wherein the thickness of the pluralities of blades varies along a chord of each blade by a factor between 1 and 15 times a minimum thickness.

8. The thrust reverser cascade according to claim 1 further comprising a plurality of cells, each cell delimited by two blades and portions of spars, one cell out of two cells being surrounded by fibrous webs, the cells surrounded by fibrous webs being disposed in quincunx.

9. The thrust reverser cascade according to claim 1, wherein the pluralities of blades have a U-shaped fold-back of fibrous webs over adjacent spars, the U-shaped fold-back of fibrous webs covering the first and second aerodynamic surfaces of the pluralities of blades over the thrust reverser cascade.

10. The thrust reverser cascade according to claim 1, wherein a fiber content is higher than 50% of a total volume of the composite material formed by the at least one fibrous web.

11. The thrust reverser cascade according to claim 10, wherein the fiber content is about 60% of the total volume of the composite material formed by the fibrous web.

12. The thrust reverser cascade according to claim 1, wherein the plurality of fiber pieces have a thickness between 0.1 mm and 0.4 mm, a length between 15 mm and 60 mm, and a width between 10 mm and 40 mm.

13. The thrust reverser cascade according to claim 1, wherein the plurality of fiber pieces comprises woven fibers so as to form mats of woven fiber pieces pre-impregnated with resin.

14. The thrust reverser cascade according to claim 1, wherein the plurality of fibers are within a thermosetting matrix, wherein the thermosetting matrix is selected from the group consisting of epoxides, benzoxazines, polyesters, and bismaleimides.

15. The thrust reverser cascade according to claim 1, wherein the plurality of fibers are within at least one thermoplastic matrix selected from the group consisting of polyamides, polypropylenes, polyetherimides, polyethersulfones, polyphenylene sulfides, polyaryletherketones, polyether-ether-ketones, and polyether-ketone-ketones.

* * * * *